Sept. 8, 1931.    F. T. SNYDER    1,822,383
PROCESS OF MAKING A SOLID FUEL
Filed June 8, 1925
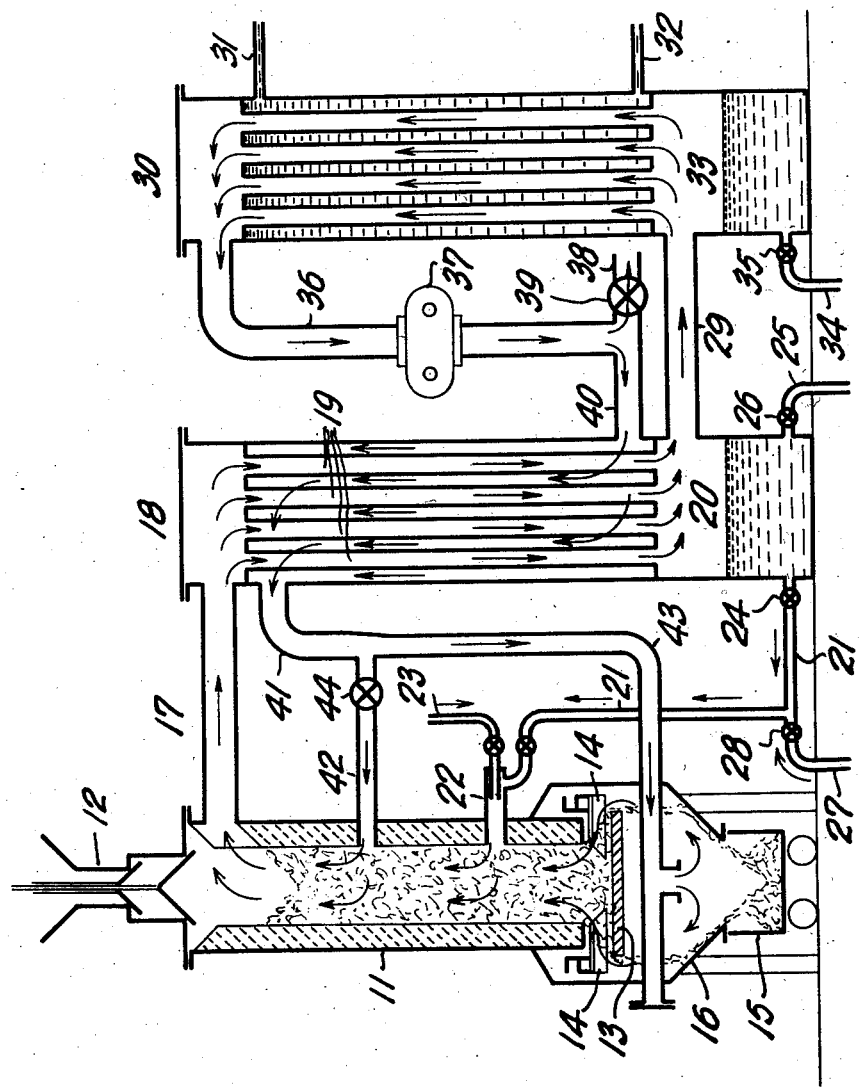
Inventor
 Frederick T. Snyder
By
   Attorney Patented Sept. 8, 1931

1,822,383

UNITED STATES PATENT OFFICE

FREDERICK T. SNYDER, OF NEW CANAAN, CONNECTICUT

PROCESS OF MAKING A SOLID FUEL

Application filed June 8, 1925. Serial No. 35,805.

This invention relates broadly to a process of making a new and advantageous form of fuel from volatile bearing materials, such as bituminous coal, wood, and other materials having a combustible base. In general, the process consists in reducing the percentage of oxygen and hydrogen in such material, while producing a fuel of good mechanical strength and with ready burning characteristics.

In a simplified statement, this process as applied to treatment of coal consists in removing a large part of the volatiles from the material without decomposition of such removed volatiles at a temperature below the fusing temperature of the material when in contact with such volatiles, then heating the solid residue above the temperature of decomposition of the volatiles remaining in the residue, selectively condensing the removed volatiles and passing the vapor of the higher boiling range portion of such volatiles, or vapors of volatiles from a source external of the system, in contact with the hot solid residue, whereby the vapors are cracked and deposition of carbonaceous material on the solid residue is effected.

The accompanying diagrammatic drawing illustrates one approved form of apparatus for carrying the process into effect. This apparatus consists of an open-bottomed kiln 11, into the top of which the raw fuel material is charged by a feeder 12 and supported while in the kiln by a stationary plate 13 spaced from the bottom of the kiln. The manufactured fuel is withdrawn from the bottom of the kiln by plows 14 which scrape the fuel off the plate 13 into a removable car 15. Air is excluded from the hot product and from the bottom of the kiln by a hopper 16 extending from the kiln to the car. The gases generated in the process are removed from the kiln 11 through a pipe 17 into a heat exchanger 18.

In the exchanger the gases flow through the tubes 19 and are partially cooled and this cooling causes the high boiling volatile vapors in the gas to condense out. These condensed liquid fuel oils accumulate in the bottom of the exchanger in a reservoir 20 from which they are withdrawn through a pipe 21 and returned to the kiln by means of an injector 22 operated by a supply of compressed air, supplied through a pipe 23. The flow of these heavy condensed vapor products is controlled by a valve 24. Any excess of such condensed heavy oils is removed by a pipe 25 controlled by a valve 26. If there is not enough oil accumulated in the reservoir 20, additional oil can be added through a pipe 27 controlled by a valve 28.

The partially cooled gas leaves the exchanger through a pipe 29 and enters a surface condenser 30 in which the gas is further cooled by water, entering through a pipe 31 and leaving when hot by a pipe 32. This further cooling causes additional vapors to condense out and accumulate in a reservoir 33 in the base of the condenser, from which the condensate is removed by a pipe 34 controlled by a valve 35. The cooled gas is removed from the condenser through a pipe 36 by means of an exhauster 37. Part of the gas from the exhauster is removed for industrial use through a pipe 38 controlled by a valve 39 which may be regarded as being or including an oil seal or other means to regulate the pressure in the system. The remainder of the cool gas from the exhauster enters the heat exchanger 18 through a pipe 40 and flowing around the tubes 19 acts as the cooling medium for the condensation of the high boiling temperature vapor products. Leaving the heat exchanger through the pipe 41, this gas in a reheated condition is divided into two portions, one of which re-enters the kiln through a pipe 42 leading to the upper portion of the kiln, while the other portion re-enters the kiln at its base through a pipe 43, the flow in the former pipe being controlled by a valve 44.

The operation of the process and apparatus is in many respects the same as described in my copending application executed of even date herewith filed the 8th June, 1925, Serial No. 35802. To initiate distillation, the system is charged with non-oxidizing gas and the gas and retort are heated to requisite temperatures in any suitable way as by burning fuel in the lower part of the retort and gradually filling the retort with coal. The gas charge in the system may be in part the gaseous products of such combustion. The amount of gas in the system and the temperatures depend entirely upon the rate of coal feed and the kind of coal For average high volatile bituminous coal the amount of gas will be approximately sixty cubic feet per pound of coal fed and the temperature of the gas leaving the top of the retort will be around 300° F. with the temperature of the gas entering at the bottom and intermediate point in the retort somewhat lower than this, say, not above 290° F. The speed of circulation is preferably as great as can be attained without carrying the fines from the retort into other parts of the system. Gas is discharged from the system at the rate of production, so that the amount of gas circulating is kept constant. The portion of gas entering the base of the kiln absorbs heat from the solid distillation residue (char) leaving the kiln and reduces the temperature of the same below the temperature at which it would ignite when exposed to the air. The zone of the kiln in which this cooling of the solid residue occurs, i. e. the portion of the kiln below the injector 22 is termed the cooling zone. The heat absorbed by the gas in the cooling zone is carried upwardly into the zone between the injector 22 and the upper gas inlet 42, called the carbonizing zone, and provides part of the heat necessary for the final stages of distillation and for the cracking of some of the remaining volatiles and cracking of the oil introduced by the injector. The remainder of the required heat is supplied in part by the exothermic heat of the coal when coal is the raw material, and in part by combustion of a small part of the oil or of the char, or of both, with air supplied through the injector, but the additional heat may if desired be supplied by some other means, such as the introduction of a current of hot reducing gas through the injector or at approximately the level of the injector. In many instances it is possible or necessary to dispense with the use of air or other means of supplying heat additional to the exothermic heat of the coal.

The physical form of the char in the carbonizing zone is the same as the physical form of the raw material fed into the kiln as to size and shape of the lumps, but is in addition rimose, i. e., characterized by the existence of a multitude of small fissures occurring in the case of coal between the laminations of vegetable matter from which the coal was formed, and in the case of wood between the fibres.

The heavy high boiling point oil blown into the kiln at 22 by the high pressure air supply from the pipe 23, is vaporized by the heat of the solid residue and the vapors are decomposed by contact with the hot residue. In decomposing, the oil vapors break up into permanent gases, condensable fractions with low boiling points and a solid carbonaceous product very low in hydrogen. This carbon product is adherent and fills the fissures of the solid residue and covers the surface and serves to make the pieces of the solid residue strong mechanically so that it will stand transportation and handling without breaking. The resulting product of this process resembles anthracite coal in appearance and in its combustion characteristics.

It is a characteristic of this invention that the maximum temperature of the char in the carbonizing zone is higher than the maximum temperature of the gas flowing through the zone. The temperature difference is from 50° F. to 200° F. and the result is that the oil vapors crack on the char and not in the gas. This is very important as it ensures deposit of the liberated carbon on the char where it is needed and not in the gas current where it would be useless.

The gases passing upwardly from the carbonizing zone into the evaporating zone above the pipe 42 comprise the original gas which entered at the bottom of the kiln, the permanent gas distilled from the solid material in the carbonizing zone and the permanent gases and oil vapors derived from the oil cracked in this zone, together with gaseous products of combustion or any heating gas introduced. This gas and vapor mixture is at too high a temperature to distill material in the top zone without causing fusion of the same and is also insufficient in amount to effect evaporation of the volatiles at temperatures below their boiling points and below the fusing temperature of the raw material while in contact with the volatiles.

A very considerable addition of gas is therefore made through the pipe 42, this added gas being greater in volume than the total of gases and vapors rising from the carbonizing zone and materially lower in temeprature. The resultant mixture is of sufficiently low temperature to avoid fusion of the raw material while the volume and total heat is sufficient for the required distillation. All the gas entering the kiln, as well as the gases and vapors produced in the kiln, leave the charge of material in the kiln through the free surface of the top of the charge, in this way passing through the portion of the charge which has been most recently introduced into the kiln. The amount of gas so passing is regulated to be sufficient to carry over all the condensable vapors from the kiln without condensation, while the temperature of the outgoing gas is kept below the fusing temperature of the freshly charged material.

The total of gases and vapors entering and generated in the kiln are withdrawn from the top of the kiln through the pipe 17 and are subjected to a fractional condensing operation, the first stage of which is in the exchanger 18, and the second in the condenser 30. A part of the gases leaving the condenser is returned through the exchanger, to the cooling agent, in order to return heat to the kiln and reduce the amount that must be generated. The remainder of the gases is cleansed in any suitable way for commercial use. The high boiling oils recovered as condensate in the exchanger may be returned to the kiln for cracking but, as it frequently happens that these oils are more valuable than suitable oils from other sources, it may be more profitable to retain this condensate and to purchase the oil required for cracking.

Certain carbonaceous materials, such as high volatile coal, are soluble or fusible in their volatile contents at temperatures above the melting temperatures of the volatiles, of which phenomenon the "sticking" of coal in previously known distillation processes is an example. If the volatile constituents of the material are removed, the fusing temperature of the residue is raised. High volatile coal contains a long series of condensable volatiles having melting points ranging up to 600° or 650° F. under ordinary conditions, and also additional volatiles which are ordinarily non-condensable and which are given off above 600° or 650° F. as permanent gases. According to this invention, the volatiles are removed at temperatures materially below their normal melting temperatures, with the result that the solid material is never in danger of fusion or solution in its extracted volatiles. Under the conditions of this process, substantially all the condensable volatiles are removed below 400° F. and the non-condensable volatiles between 400° and 1000° F. or slightly higher. The temperature of the solid residue is about 1000° F. when the oil is subsequently introduced for cracking. In other words, the non-condensable volatiles are taken off before cracking of the injected oil occurs. This is important since, if it did not occur, the introduction of the oil would produce conditions similar to those which cause sticking in previously tried processes. The substantially complete removal of volatiles produces a char which will not fuse or dissolve in the returned oil, even at temperatures considerably above 1000° F.

It has been ascertained that when a fluid flows past a solid surface, there is a smoothly flowing film of the fluid between the turbulent main body of the flow and the solid surface. The thickness of this film depends on the speed of the flow and the nature of the surface. The higher the flow speed the thinner the film.

It has also been ascertained that when a liquid evaporates into a current of gas the rate of evaporation is largely controlled by the thickness of the smoothly flowing gas film in contact with the liquid. The vapor passes through the film by diffusion at right angles to the direction of flow and the speed of this diffusion is low. The phenomenon termed "solid evaporation", i. e., the condition in which a substance has the appearance of passing directly from the solid state to the vapor state without any visible intermediate liquid state, and ascribed to a lowered partial pressure of the vapor, may be due to a gradual resolution of the solid into liquid at a rate below the rate of evaporation and diffusion of the vapor through the contacting gas film.

Thus, in the distillation of bituminous coal or wood in a high velocity current of gas having a temperature below the normal fusing temperature of the raw material and below the boiling temperatures of the contained volatiles, as effected according to this invention, it would appear that the volatiles melt to liquid state within the solid and pass, by capillary action, through the pores or fissures between laminations or fibres, to the surface at a rate below their rate of evaporation and vapor diffusion through the enveloping film of smoothly flowing gas so that there is no visible liquid at the surface of the solid, with the result that the sticking commonly met with in ordinary coking processes is entirely avoided.

According to this invention the volume of gas, which is circulated through the kiln, is many times the volume of the gases and vapors which can be distilled from the raw material in the kiln and the speed of circulation is high so that the entire volume of the gas sweeps through the mass of material many times in the course of distillation, with the result that in each circuit the volume of the gas is vastly greater than the volume of vapors it carries away, and is in fact so greatly below the saturation point that it may be termed dry. This relatively very large volume of circulating gas ensures an ample supply of heat permitting rapid distillation and, owing to its dry condition, also ensures a very considerable lowering of the partial pressures of the vapors of the volatiles in the material being distilled. The high speed of circulation causes the aforesaid film of gas around the solid material to be very thin, so that the rate of diffusion of the vapors through the film is much greater than the rate at which the volatiles reach the surface of the material and evaporate. Thus, the dual effect of the great volume and high speed of the gas is to entirely avoid sticking either by reason of sweating oils out of the material faster than they can be evaporated or by reason of condensation of evaporated volatiles on the incoming cold material, while the low temperature of the gas avoids actual fusion of the material. The net result is that a larger amount of material may be treated per unit of time in apparatus of given size than would be possible without the use of circulating gas, with consequent low operating cost. It may be stated on a basis of cubic capacity the cost of apparatus used in carrying out this process is much less than any coking plant. While the weight of material distilled is greater per time unit. Also, the amount and value of the products are greater per unit weight of raw material than in the best coking practice.

Reference has been made hereinbefore to operating without the use of air. This is possible with some grades of raw material having a large amount of exothermic heat owing to the high heat efficiency of the process. The amount of exothermic heat in the raw material is a property of the material which cannot be altered, that is, nothing can be done to increase or decrease the amount of this available heat for any raw material. It amounts for bituminous coal to between 300 B. t. u. and 400 B. t. u. per pound. It is possible, however, to operate in such a manner as to make the ratio of the exothermic heat to the total required heat very high and it is further possible to conserve as much as possible of the exothermic heat. These possibilities are taken advantage of to the utmost in the practice of this invention, in fact, the invention may be said to lie largely in the application and co-relation of these facts. For instance, the total heat involved in coke oven practice is about 1600 B. t. u. per pound of coal. Thus, the exothermic heat is less than 25% of the total. According to this invention, the total heat is around 800 B. t. u. so that the exothermic heat is about 50% of the total. The actual absorption of heat in this process is about 350 B. t. u., which is for some coals less than the exothermic heat of the coal, leaving a surplus of heat available for cracking oil. This absorption includes the heat in the products not returned to the kiln and the radiation loss. Thus, when using some varieties of coal, it is possible to dispense with the use of air as the exothermic heat of the coal renders the combustion heat unnecessary, and again with other types of coal it is necessary to eliminate the combustion with air, since the addition of this heat to the exothermic heat of the coal would give an excess of heat. It is possible to control, in some measure, both the heat and the temperature by altering the relative lengths of the zones of the kiln, and also by regulating the proportions of gas introduced at the bottom of the kiln and through the pipe 42, and also at the level of the injector, as described in my prior application already referred to. Also the amount of sensible heat passing from the carbonizing zone to the evaporating zone may be regulated by regulating the amount of oil admitted for cracking. It must be noted, however, that any heat in excess of that required for continuance of the operation which is removed from the kiln as latent heat in the vapors and gases derived from cracked oil, must be extracted in the condenser to avoid an excessive return of heat to the kiln. In other words, a balance must be preserved between the heat supplied to and released in the kiln and frictional heat due to circulation of the gas on the one hand and the heat absorbed in the distillation and the heat lost in discharged char and in the condenser and in radiation, on the other hand.

When the incoming coal has been heated by the warm circulating gas to the temperature at which decomposition starts, the coal commences to give up its exothermic heat. Part of this heat is immediately carried away in the circulating gas and vapors of distillation and the remainder superheats the solid residue of the coal to a temperature above the temperature of the circulating gas. Oil vapors cracked in contact with this superheated residue carry away some of the exothermic heat as sensible and latent heat and a further part of the exothermic heat is recovered by the gas entering the bottom of the kiln in contact with the escaping hot residue. Some of the heat thus recovered is transferred to the oil vapors as latent heat and some as sensible heat. As the gas and vapors rise through the kiln, they give up a portion of this absorbed exothermic heat in initiating distillation, but the major portion passes out of the kiln to the heat exchanger where much of the sensible and latent heats are recovered for return to the kiln. Where the amount of heat thus recovered and returned is insufficient for continuance of the distillation, additional heat must be supplied by combustion with air or otherwise, but when the amount of recovered heat is in excess of the distillation requirements it may be absorbed in vaporizing and cracking oil. Thus, the necessity for air combustion depends primarily upon the quality of the coal and secondarily upon the amount of oil it is necessary to crack in order to secure the desired mechanical strength of the finished fuel. The possibility of heat recovered may also be utilized to a greater or lesser extent according to the relative proportions of gas put into the bottom and the upper part of the kiln. Up to a certain critical point the larger the proportion of gas entering the bottom of the kiln the greater will be the heat recovery and the higher the temperatures in the kiln, thus permitting cracking of a greater amount of oil.

When dealing with a non-coking coal, it is possible to eliminate the return of gas to the kiln through the pipe 42, the entire amount of gas returned from the exchanger being put into the bottom of the kiln. The higher temperatures thus obtained will not be detrimental and may be readily controlled by regulating the amount of oil introduced for cracking.

It is to be noted that the oils condensed in the heat exchanger in general will contain a less proportion of hydrogen and a greater proportion of carbon than the oils condensed in the condenser, owing to the fact of their higher condensing temperatures. The temperature range and catalytic conditions in the kiln are such that the cracking will produce a very good grade of oils recoverable in the condenser. A large part of this recovery will lie within the established vaporizing limits of gasoline but the oil will probably have a materially greater mileage than ordinary gasoline owing to the higher percentage of carbon ring products resulting from the good cracking conditions of this process.

Since it is one of the objects of this invention to produce from bituminous coal a solid fuel closely resembling anthracite coal, the distillation of the coal is preferably not carried as nearly to completion as would be the case if a maximum yield of gas was the primary object. Actually, some of the highest boiling volatiles, which upon removal are permanent gases, may be allowed to remain and with the return of oil the amount of volatiles in the product is equal to from 20% to 30% of the amount of volatiles in the original coal, and is about 7% to 10% of weight of the product. With this volatile content, the product analyses about the same as commercial grades of anthracite and has about the same freedom of burning. The volatile content and the carbonaceous deposit render the product about equal to anthracite in toughness and freedom from disintegration in handling and burning. The hardness of the product depends to some extent on the amount of carbonaceous material deposited and on the temperature at which the deposit occurs. When the return of high boiling condensate to the kiln is supplemented by oil from some outside source, or when only such oil is used it may happen that the amount of carbon deposited on the char will be in excess of that removed by distillation and it may on occasion be advisable that such should be the case.

While the description of this invention has heretofore dealt almost exclusively with coal and with distilling operations at temperatures below the fusing temperature of this material, whereby the char produced retains the shape and size of the coal upon which carbon is deposited, it will be understood that any suitable agglomerated mass resembling gas coke, or any other desired form of combustible material may be strengthened and its fuel value improved by heating the same and cracking oil in contact with it to effect a carbon deposit as described. It will therefore be understood that this invention in its several phases is susceptible of many variations in detail of operation and in application and that the invention is not confined to the precise manner of operation herein described but embraces all such modifications as lie within the scope of the appended claims.

Having thus described my invention, what I claim is:—

1. A process of making a solid fuel product which comprises distilling a part of the volatiles from coal, wood or like organic matter by means of a current of warm gas flowing in contact with the organic matter, cooling the gas for condensation of volatiles therein, reheating a portion of the gas with sensible and latent heats previously given up by the whole volume of gas and vapors therein, passing said reheated gas through a mass of solid residue of the distillation heated above the temperature of the gas, and passing vapors of the higher boiling condensates in contact with the hot solid residue with cracking effect and deposition of carbonaceous material on such residue.

2. A process of making a solid fuel product which comprises distilling a part of the volatiles from coal, wood, or like organic matter by means of a current of warm gas flowing in contact with the organic matter, cooling the gas for condensation of volatiles therein, reheating a portion of the gas with sensible and latent heats previously given up by the whole volume of gas and vapors therein, passing said reheated gas through a mass of solid residue of the distillation heated above the temperature of the gas, and passing hydrocarbon vapors into said gas and thereby in contact with the hot solid residue with cracking effect and deposition of carbonaceous material on such residue.

3. A method of producing solid fuel which comprises removing a part of the volatiles from coking coal at a temperature below the fusing temperature of the coal by passing a large volume of warm gas in contact with the coal, said removal causing a rimose formation of the solid coal residue, condensing volatiles out of the gas, reheating part of the gas with sensible and latent heat of the gas and volatiles and passing the reheated gas in contact with the solid coal residue heated above the cracking temperature of hydrocarbon oils, vaporizing oils in said reheated gas whereby the vapors crack on the hot residue with deposit of carbonaceous material on the surface and in the fissures thereof.

4. A method of producing solid fuel which comprises removing a part of the volatiles from coking coal at a temperature below the fusing temperature of the coal by passing a large volume of warm gas in contact with the coal, said removal causing a rimose formation of the solid coal residue, condensing volatiles out of the gas, reheating part of the gas with sensible and latent heat of the gas and volatiles and passing the reheated gas in contact with the solid coal residue heated above the cracking temperature of hydrocarbon oils, vaporizing a part of the condensate in said reheated gas whereby the vapors crack on the hot residue with deposit of carbonaceous material on the surface and in the fissures thereof.

5. A process of making solid fuel which comprises distilling coal, wood or like organic material by heating the material above the temperature at which exothermic heat is released by circulating heated gas in contact with the material, whereby the residue of the material heats above the temperature of the circulating gas and above the cracking temperature of certain hydrocarbon oils, and vaporizing such oils in the gas in contact with the residue whereby the oil vapors will crack on the residue and deposit carbonaceous matter thereon.

6. A process of making solid fuel which comprises distilling coal, wood or like organic material by heating the material above the temperature at which exothermic heat is released by circulating heated gas in contact with the material, whereby the residue of the material heats above the temperature of the circulating gas and above the cracking temperature of certain hydrocarbon oils, and vaporizing such oils in the gas in contact with the residue whereby the oil vapors will crack on the residue with absorption of exothermic heat and deposition of carbonaceous matter on the residue, and recovering a part of the exothermic heat from the residue and from the vaporous and gaseous products of the cracking and utilizing such recovered heat to heat the circulating gas for initiation of further distillation.

7. A process of making solid fuel which comprises distilling coal, wood or like organic material and removing volatiles therefrom by heating the material above the temperature at which exothermic heat is released by circulating heated gas in contact with the material, whereby the residue of the material heats above the temperature of the circulating gas and above the cracking temperature of the removed volatiles, subjecting the gas and vapors of volatiles therein to fractional condensation in which the cooled gas from the last stage is used as cooling agent in the first stage whereby exothermic heat carried out as sensible and latent heat of the vapors is recovered, further recovering exothermic heat by passing gas in contact with hot solid residue of the distillation, utilizing the recovered exothermic heat carried in the gas stream to initiate distillation of additional material, and cracking condensed volatiles in contact with the hot solid residue of the distillation, with deposition of carbonaceous material on the residue.

8. A method of making a solid fuel product which comprises removing volatiles from coal, wood or like organic material by means of a current of heated gas, condensing the higher boiling temperature volatiles from said gas by a partial cooling, further cooling said gas and condensing therefrom volatiles of lower boiling temperatures, reheating said gas and returning a substantial part of said gas to said material, injecting said volitiles of said initial cooling into the solid product of said removal by means of a supply of air, heating said solid product by the combustion resulting from said air, and cracking said returned portions of said volatiles by contact with said heated solid residue.

9. A process of treating coal, wood, or like organic material to produce a solid fuel of low volatile content and containing not less carbon than the original material, which comprises distilling the material for removal of part of the volatiles and then cracking hydrocarbon oil in contact with the hot solid distillation residue, the amount of oil cracked being sufficient to deposit on the residue an amount of carbon at least equal to that removed by the distillation.

10. A method of distilling coal, wood or like volatile containing organic material, which comprises heating the material to a temperature between the melting and boiling temperatures of a volatile constituent of the material, whereby such volatile tends to be exuded in liquid state, and circulating a current of gas in contact with the material, the volume and temperature of the gas being such that the volatile will evaporate into the gas at the rate of exudation.

11. A method of distilling coal, wood or like volatile containing organic material, which comprises gradually heating the material up to a temperature slightly below the boiling temperature of the highest boiling volatile which it is desired to remove, whereby a series of volatiles are successively liquefied and tends to be exuded in liquid state, and circulating a current of gas in contact with the material, the volume and temperature of the gas being such that each volatile will evaporate into the gas at the rate of exudation, whereby the volatiles will appear to evaporate directly from the solid state to the vapor state and the volume of the gas being further in such relation to the volume of vapor capable of being evolved at any instant that the partial pressures of the vapors are reduced to such extent that evaporation occurs at temperatures below the boiling temperatures of the volatiles.

12. A process of making a solid fuel product which comprises distilling bituminous coal to such extent as to remove substantially all the producible oils, the distillation being effected by passing a stream of heated gas resulting from previous operation of the process in contact with the coal and being conducted at a temperature below that at which a substantial amount of permanent gas is obtained from the coal, heating the coal residue to higher temperature and removing the produced gas and subsequently returning part of the produced oils to the solid residue, remaining after removal of the gas, while the residue is at higher temperature than the said gas stream and at a sufficiently high temperature to crack the returned oil, whereby the oil cracks on the solid residue forming an adherent layer of the solid cracking products on the solid distillation residue.

13. A process of making a solid fuel product which comprises distilling bituminous coal at a temperature below 600° F. by passing a stream of heated gas resulting from previous operation of the process in contact with the coal and removing the volatiles which distill off, heating the coal residue to a temperature above 1000° F. with production of gas, and subsequently returning part of the produced oils to the solid residue, remaining after removal of the gas, while the residue is at higher temperature than the said gas stream and at a sufficiently high temperature to crack the returned oil whereby the oil cracks on the solid residue forming an adherent layer of the solid cracking products on the solid distillation residue.

14. A process of making solid fuel which comprises distilling coal and other solid organic material by circulating gas resulting from previous operation of the process in contact with said material heated above the temperature at which the exothermic heat is released from said material whereby said material heats above the temperature of said gas, the gas being caused to flow through the material contrawise to the progress of distillation, and cracking oil vapours upon said superheated material by introducing the oil vapour into the circulation of producer gas at a point where they will contact first with the most completely distilled material.

In witness whereof, I have hereunto set my hand.

FREDERICK T. SNYDER.